(12) United States Patent
Sudbrack et al.

(10) Patent No.: US 9,854,723 B2
(45) Date of Patent: Jan. 2, 2018

(54) GUIDE FOR LIFT ARM OF HEADER ATTACHMENT APPARATUS

(71) Applicant: CNH Industrial America LLC, New Holland, PA (US)

(72) Inventors: Cecil R. Sudbrack, New Holland, PA (US); Brendon Earl, Lancaster, PA (US); Jeffrey B. Fay, II, Wilmington, DE (US)

(73) Assignee: CNH Industrial America LLC, New Holland, PA (US)

( * ) Notice: Subject to any disclaimer, the term of this patent is extended or adjusted under 35 U.S.C. 154(b) by 100 days.

(21) Appl. No.: 14/953,780

(22) Filed: Nov. 30, 2015

(65) Prior Publication Data

US 2017/0150674 A1 Jun. 1, 2017

(51) Int. Cl.
*A01D 34/00* (2006.01)
*A01B 63/00* (2006.01)

(52) U.S. Cl.
CPC .................................. *A01B 63/008* (2013.01)

(58) Field of Classification Search
CPC ...... A01D 41/145; A01D 41/16; A01D 41/14; A01D 41/141; A01D 67/005; A01B 59/006; A01B 59/064
USPC .......................................................... 56/15.6
See application file for complete search history.

(56) References Cited

U.S. PATENT DOCUMENTS

| 3,324,637 | A | * | 6/1967 | Windsor | A01D 41/16 56/15.6 |
| 3,431,711 | A |   | 3/1969 | Claas | |
| 3,488,930 | A | * | 1/1970 | Feldmann | A01D 41/16 56/11.9 |
| 3,958,399 | A |   | 5/1976 | Schoeneberger | |
| 4,280,317 | A | * | 7/1981 | Lindblom | A01D 41/16 56/15.6 |
| 4,444,000 | A |   | 4/1984 | Enzmann et al. | |
| 6,349,959 | B2 | * | 2/2002 | Schlegel | A01B 59/006 116/284 |
| 6,896,070 | B2 | * | 5/2005 | Wood, Jr. | B60D 1/141 172/272 |
| 7,404,448 | B2 | * | 7/2008 | Tuttle | B60D 1/04 172/439 |
| 7,650,736 | B1 |   | 1/2010 | Salley et al. | |
| 8,631,634 | B2 | * | 1/2014 | Vereecke | A01D 41/16 56/14.9 |
| 8,745,964 | B2 | * | 6/2014 | Patterson | A01D 43/04 56/15.8 |
| 9,137,946 | B2 | * | 9/2015 | Verhaeghe | A01D 41/16 |
| 2016/0128261 | A1 | * | 5/2016 | Figger | A01B 59/006 56/10.1 |
| 2016/0165796 | A1 | * | 6/2016 | Carpenedo | A01D 41/16 56/14.7 |

* cited by examiner

*Primary Examiner* — Arpad Fabian-Kovacs
(74) *Attorney, Agent, or Firm* — Peter K. Zacharias; Patrick M. Sheldrake

(57) ABSTRACT

A header assembly is removably attached to lift arms of an agricultural harvester by lift pins on the header assembly received in upwardly facing cups on the ends of lift arms. Guides including target portions suspended lower than the lift pins receive the lift arms to position the cups below the lift pins. The guides are pivotally connected to the header assembly and are rotated by the lift arms engaging guide lift elements as the lift arms are raised to engage the cups with the lift pins.

20 Claims, 7 Drawing Sheets

GUIDE FOR LIFT ARM OF HEADER ATTACHMENT APPARATUS

BACKGROUND OF THE INVENTION

1. Field of the Invention

The present invention relates generally to agricultural harvesters, more specifically to apparatus for attaching a header assembly to such harvesters, and still more specifically to guides for directing lift arms of the harvester to lift pins on the header assemblies.

2. Description of the Related Art

Agricultural harvesters of many different types commonly incorporate easily attachable and detachable headers to provide flexibility in the type of crop to be harvested, thereby enabling a primary implement unit to be used with a variety of attachments for different types of crops at different times. Along with the flexibility of changing out the header, it has been a goal to make the installation and removal as quick as possible, but at the same time simple and direct so that a single operator can complete the task alone.

Existing header assemblies are usually supported by a pair of lower lift arms pivotally secured to the main body of the agricultural harvester and a third arm between and above the lower lift arm. All three arms are pivotal through appropriate actuators to change the level of the header relative to the ground (and its attitude) to facilitate harvesting of varied crops under different conditions. The connection between the lift arm and the header is accomplished by upwardly facing, U-shaped recesses or cups on the ends of the lift arms, which mate with corresponding horizontal lift pins on the header. Various types of locking mechanisms can be used to ensure that the lift pins, and thus the header, are secured safely to the agricultural harvester.

The upwardly facing U-shaped recesses or cups on the lift arms mating with simple horizontal lift pins on the header enable simple and quick connection of the header to the harvester, so long as the lift arms and lift pins are aligned properly. However, in some harvester arrangements, it is difficult for an operator of the harvester to see the lift pins while advancing the harvester toward the header for connection. For example, on a draper header for a self-propelled windrower, the lift pins are located generally beneath the header, on horizontal elements of inboard struts tucked up under the header where the operator cannot see the pins from the operator's seat on the harvester. Accordingly, the operator cannot see the pins while driving the harvester toward the header to attach the header to the harvester. As a result, it is often necessary for another worker to function as a spotter, directing the harvester operator to the proper position left and right, forward and aft so that the cups on the lift arms engage the lift pins on the header. While a skilled operator familiar with both the harvester and header can develop sufficient familiarity with the proper alignment of the harvester with the header so as to successfully exercise best judgment with the proper positioning of the lift cups with respect to the lift pins, it also can be a source of frustration, and can result in damage to the header, harvester or both when misalignment occurs. The use of a spotter increases the labor required for the simple task of attaching a header to a harvester at a time when the industry is moving toward reduced labor requirements for equipment operation. It can be both costly and inconvenient for a spotter to be available at the time and location required when a header is to be attached to a harvester.

For harvesting some crops, headers are operated very close to the ground, or even riding on the ground. Accordingly, any additional structure projecting lower than the existing header frame and necessary header structure can interfere with the desired header performance.

Since many headers and harvesters have long expected useful operating lives, modifications to either must be backward compatible and/or as simple retrofits so as not to render existing equipment unusable.

Headers may be positioned on the ground, at some elevation on stands or supporting structures, or even on truck beds when the harvester is to be connected thereto. Any modifications to the structures or procedures for completing the attachment must be compatible with all such situations.

Accordingly, what is needed in the art is structure that guides and directs lift arm cups toward lift pins for the attachment of a header to a harvester which can be added as simple retrofits to function with existing header and harvester structures in various applications and uses to facilitate connection by a single worker operating the harvester.

SUMMARY OF THE INVENTION

In one aspect of the present invention the structure is provided to direct lift arms on a harvester toward lift pins on a header attachment, with final attachment resulting in the structure being moved to and in obtrusive position.

In one form, the invention is a header assembly for attachment to a lift arm of an agricultural harvester, provided with a frame member, a lift pin attached to the frame member and a guide rotatably secured to the header assembly. A target portion of the guide depends lower than the lift pin, and a guide lift element overlies the lift arm and is operated by raising the lift arm to rotate the guide while the header assembly is being attached to the harvester and the lift arm is raised toward the lift pin.

In another form, the invention provides a connection system between an agricultural harvester and a header assembly. A lift arm is connected to the agricultural harvester and includes an upwardly opening cup at an end thereof. A lift pin is connected a header frame and is configured to be received in the cup. A guide suspended from the header assembly has a position to present at least a portion of the guide lower than the lift pin. A connection between the guide and the header assembly is adapted for pivotal rotation of the guide relative to the header assembly when the arm is raised to engage the lift pin. A guide lift element is positioned above the lift arm for engagement by the lift arm upon the lift arm being raised toward the lift pin, for rotating the guide relative to the header assembly as the header assembly is connected to the agricultural harvester One advantage of the present invention is providing clearly visible guiding structures on a header to receive lift arms of a harvester.

Another advantage is that the guiding structure positions the lift arms left and right as well as forward and aft to center the lift pins over the lift cups.

Yet another advantage is that the guiding structure is or is moved to a nonobtrusive, noninterfering position when the header is attached to the harvester.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention and such exemplification is not to be construed as limiting the scope of the invention in any manner.

DETAILED DESCRIPTION OF THE INVENTION

Figure 1:
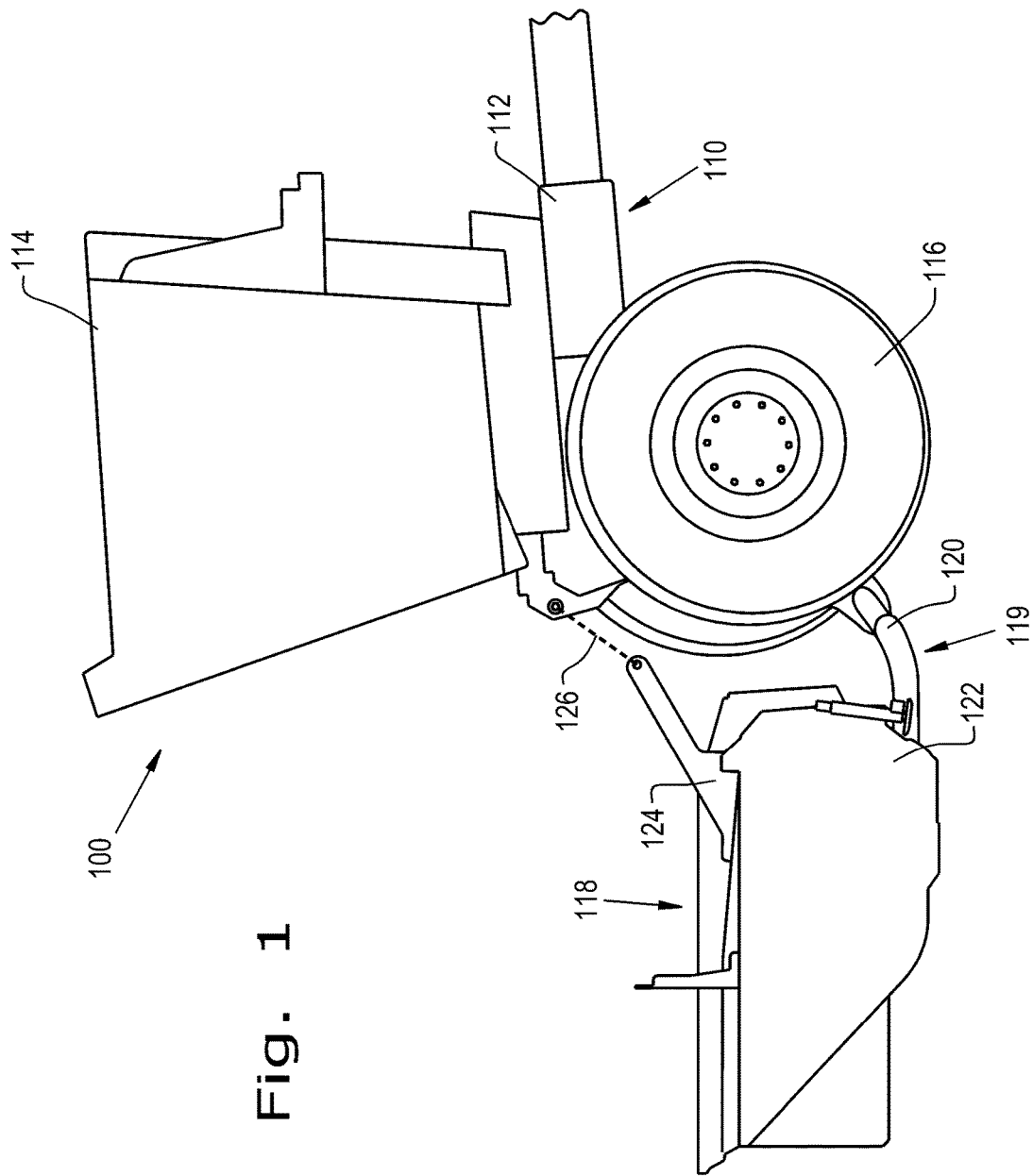
FIG. 1 is an elevational view of a portion of an agricultural harvester and a header assembly with which the guide disclosed herein may be used.

Referring now to the drawings, and more particularly to FIG. 1, there is shown an agricultural implement 100 in the form of an agricultural harvester 110 having a removable header assembly 118 connected thereto. Harvester 110 includes a frame 112 and an operator cab 114. Ground drive wheels 116 are provided to enable the harvester to traverse a field. To enable a more clear understanding of the present invention, other portions of the agricultural harvester 110 are not shown, such as a power unit, drive train and crop processing unit. So too with respect to header assembly 118. Other portions thereof are not shown, such as crop severing or cutting systems, crop gathering structures or systems and crop moving systems are not shown. It is to be understood by those skilled in the art that these may be implemented in various forms to complete the functions of agricultural implement 100 in traversing a field, severing crop material and processing the crop material for the grain contained therein. Harvester 110 can be used with a variety of different header assemblies interchangeably connected thereto. Various different types can be used and are not directly related to the invention described herein, and therefore are not shown or described in greater detail.

Figure 2:
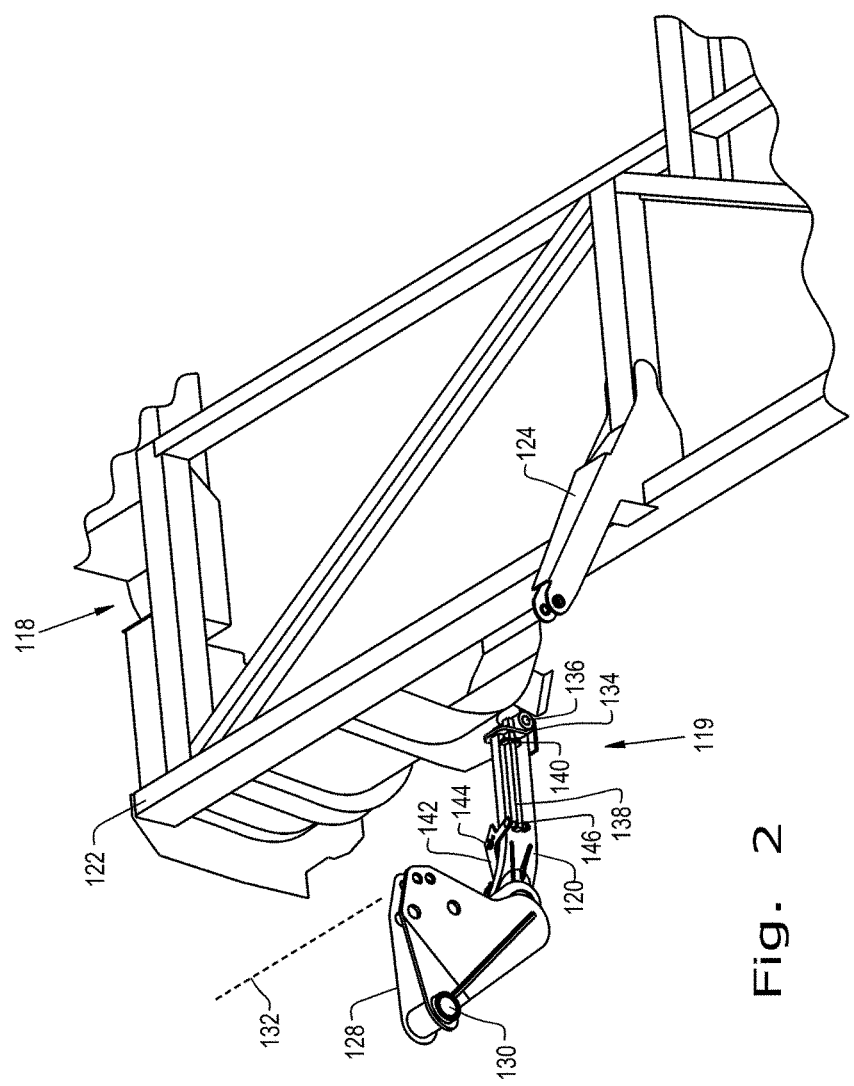
FIG. 2 is a perspective view of a portion of the agricultural harvester of FIG. 1, showing the interconnection between a header assembly and the agricultural harvester.

Header assembly 118 is attached to agricultural harvester 110 by way of a connection system 119 that includes cooperating components on each harvester 110 and header assembly 118. Header assembly 118 is supported at its bottom edge by lift arms 120 secured to and operable at the forward portion of agricultural harvester 110. Header assembly 118 has a header frame 122 and a central arm 124 which connects to an actuator 126 shown as a dashed line extending to harvester frame 112. Referring particularly to FIG. 2, each lift arm 120 is connected to a plate 128 that is pivotally mounted to agricultural harvester 110 at pivotal connection 130 and which is connected to an actuator 132, shown as a dashed line, to pivot plate 128 and lift arm 120 about pivot point 130. Lift arm 120 has an upwardly facing U-shaped recess or cup 134 at the distal end which receives a lift pin 136 secured to the rearward face of header frame 122. The upwardly facing U-shaped recess 134 enables header assembly 118 to be connected to and disconnected from agricultural harvester 110 via the engagement and disengagement of lift pin 136 in cup 134.

In order for the header assembly 118 to be locked in place when attached to harvester 110, a bar 138 is mounted adjacent lift arm 120 and extends through an opening 140 to capture lift pin 136 when the bar 138 is in its forward position. Bar 138 is actuated by a lever arm 142 pivotally secured to the lift arm 120 at an axis 144 which is vertical so that the lever arm 142 pivots in a horizontal plane. Lever arm 142 is connected pivotally to bar 138 at a pivotal connection 146.

Figure 8:
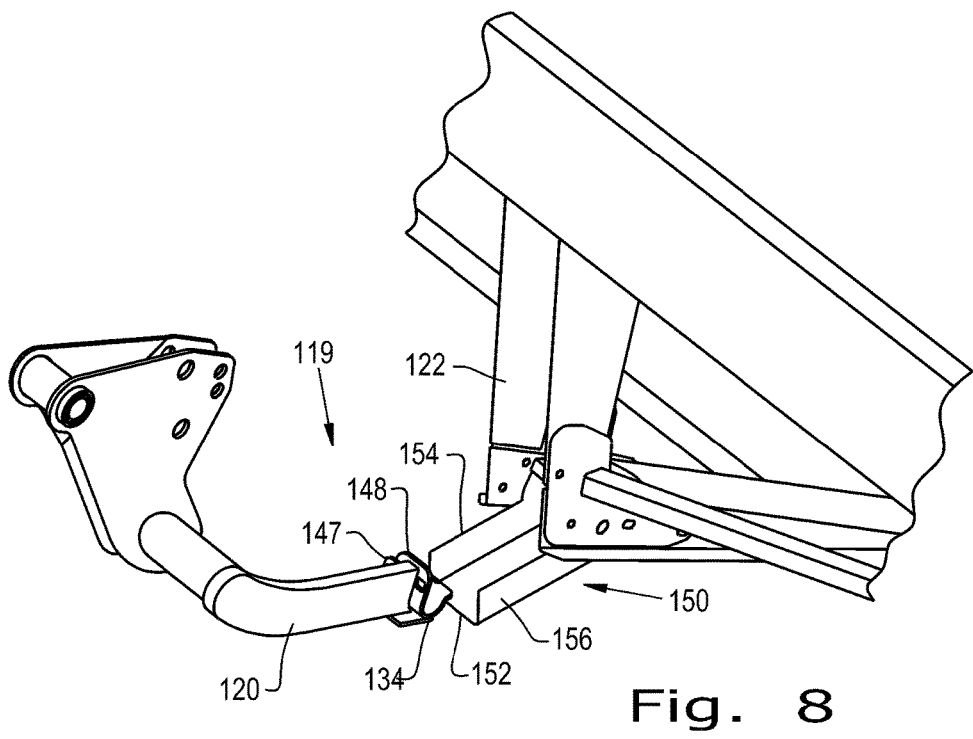
FIG. 8 is fragmentary perspective view the lift arm and header assembly, showing the relative positions thereof when commencing attachment of the header assembly to the lift arm.

As shown most clearly in FIG. 8, cup 134, while upwardly directed is somewhat forwardly oriented and includes a rear face 147 that is higher than a forward face 148 thereof.

Figure 3:
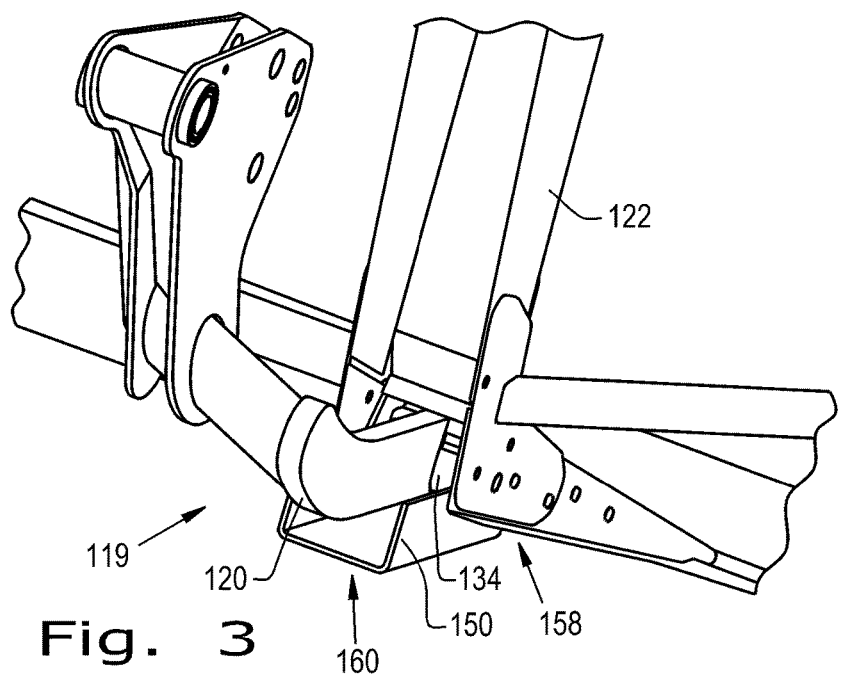
FIG. 3 is a fragmentary perspective view of a portion of the agricultural harvester and header assembly of FIG. 2, showing an intermediate stage during the attachment of the header assembly to the agricultural harvester.
Figure 4:
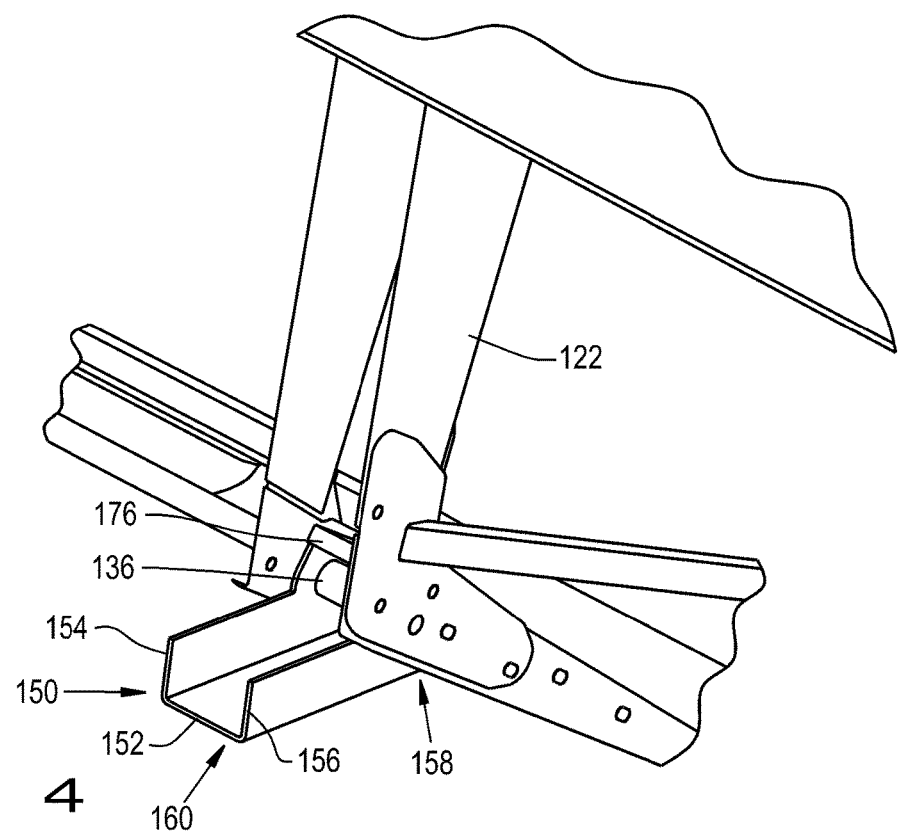
FIG. 4 is a fragmentary perspective view of the header assembly of FIG. 2, showing the header assembly and guide in position to receive a lift arm for attaching the header assembly to an agricultural harvester.

Referring now to FIGS. 3 & 4, a guide 150 to receive lift arm 120 is provided to facilitate the proper positioning of cup 134 beneath and aligned with lift pin 136. Guide 150, in the exemplary embodiment shown, is a channel-like structure having a bottom 152 and opposed side members 154, 156 extending upwardly along the lateral edges of bottom 152. Side members 154, 156 are spaced from one another a sufficient distance to receive cup 134 there between. While shown as a straight channel having a flat bottom 152 and parallel side members 154, 156 it should be understood that guide 150 can be otherwise configured. For example, bottom 152 need not be flat, but can be rounded or angled downwardly from each side toward the center, and side members 154, 156 need not be parallel but can be, for example, outwardly flared from generally an inward end 158 to an outward end 160 at which lift arm 120 enters guide 150.

Figure 5:
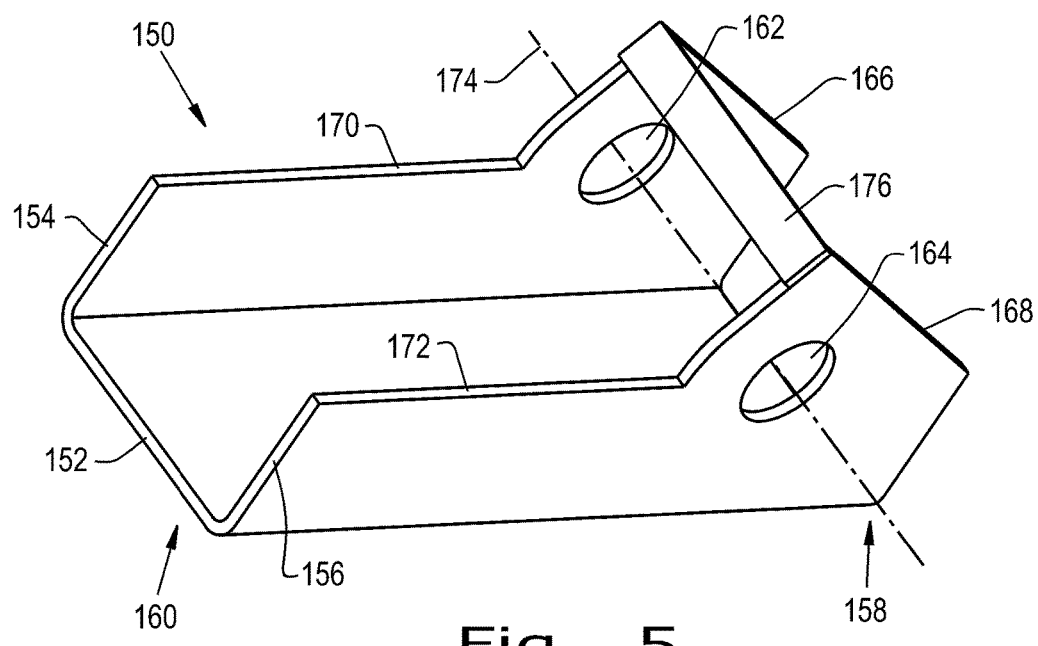
FIG. 5 is a perspective view of the guide shown in FIGS. 3 and 4.

With reference now to FIG. 4, and more particularly FIG. 5, side members 154, 156 define apertures 162, 164 respectively through which lift pin 136 is received so that guide 150 is suspended pivotally from lift pin 136. Apertures 162, 164 are positioned more inwardly than outwardly with respect to inward end 158 and outward end 160. Above apertures 162, 164 and toward inward end 158, inward upper edge segments 166, 168 of side members 154, 156 angle downwardly toward inward end 158 so that guide 150 can pivot about lift pin 136 such that bottom 152 angles downwardly, substantially as shown in FIG. 4, with upper edge segments 166, 168 defining natural stops when engaged against frame structures of header assembly 118. Angled downwardly as shown in FIG. 4, guide 150 provides a very clear and observable target portion thereof at outward end 160 in which to insert lift arm 120 when header assembly 118 is attached to harvester 110.

Figure 6:
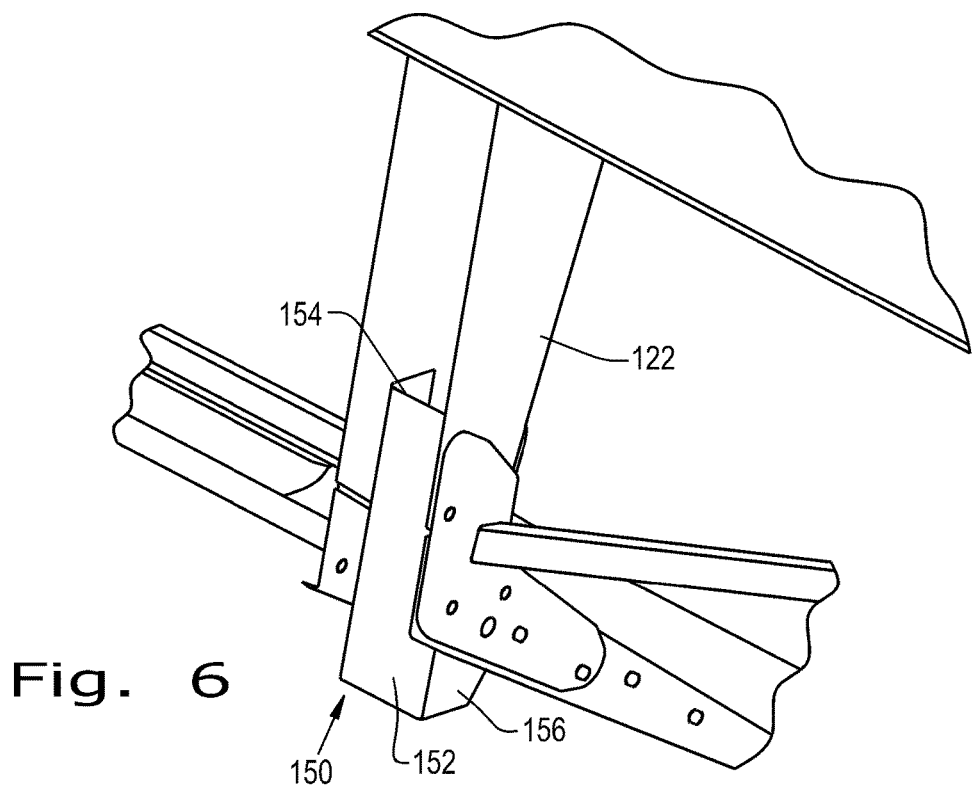
FIG. 6 is a is a fragmentary perspective view similar to that of FIG. 4, but showing the guide in a stowed position.

Toward outward end 160 from the general area of apertures 162, 164 side members 154, 156 define heights from bottom 152 to outward upper edge segments 170, 172 shorter than a height from bottom 152 to a pivotal centerline 174 defining the rotational axis of guide 150 on lift pin 136. Accordingly, guide 150 can be rotated to a substantially vertical or even inwardly canted, stowed position as shown in FIG. 6 for transporting or storing header assembly 118 with guide 150 in an out-of-the-way position.

Figure 7:
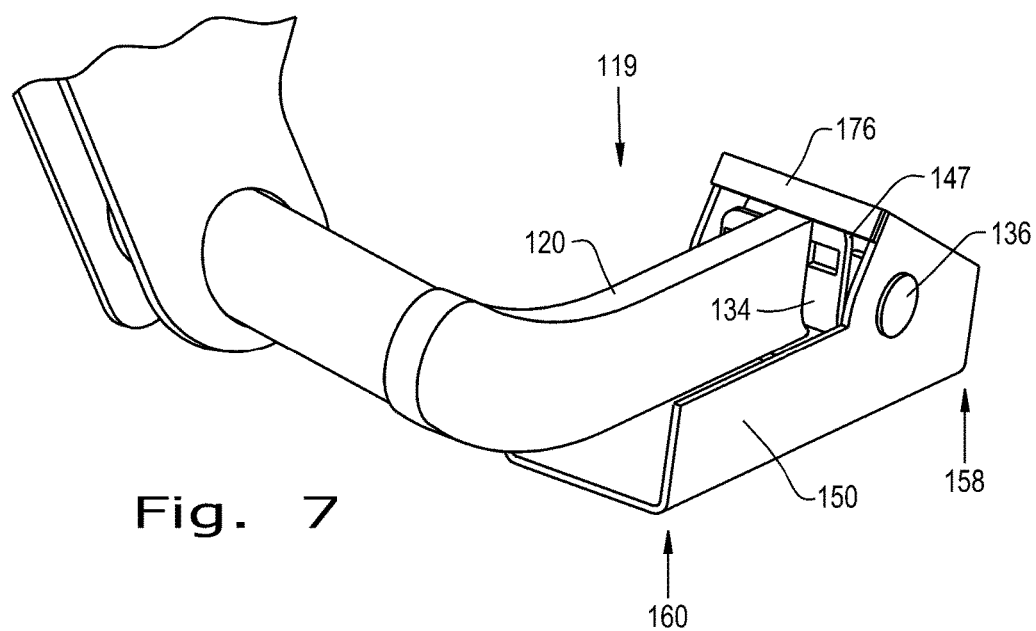
FIG. 7 is a fragmentary perspective view of the lift arm and guide, showing the relative positions thereof upon completed attachment of the header assembly to the agricultural harvester.

A guide lift element in the nature of a strap 176 extends between side members 154, 156, overlying bottom 152 in spaced relation, strap 176 being generally above and outwardly from pivotal center line 174 defined by lift pin 136 received in apertures 162, 164. Strap 176 overlies lift arm 120 when lift arm 120 is fully inserted into guide 150, with cup 134 of lift arm 120 positioned beneath lift pin 136. Lift arm 120 engages strap 176 when lift arm 120 is elevated upon attachment of header assembly 118 to harvester 110. The offset arrangement between the position of strap 176 against lift arm 120 and pivotal center line 174 results in the upward force from lift arm 120 against strap 176 causing guide 150 to pivot about center line 174, such that outward end 160 of guide 150 is raised and inward end 158 of guide 150 is lowered until bottom 152 engages the underside of lift arm 120. In this position, which is shown in FIG. 7, guide 150 extends below lift arm 120 only by the thickness of bottom 152, and does not interfere with the positioning or operation of header assembly 118.

As can be appreciated, guide 150 is an add-on structure that does not require modification of either harvester 110 or header assembly 118, only the simple attachment of the guide on the lift pin. Accordingly, the advantages of guide 150 can be achieved through a minor retrofit of existing headers, and the guide requires no modification to lift arm 120 or otherwise to harvester 110

To mount header assembly 118 on harvester 110, guide 150 is rotated on lift pin 136 so that guide 150 is in the downwardly drooping position illustrated in FIG. 4. An operator advances harvester 110 toward header assembly 118 and positions lift arm 120 to enter outward end 160 of guide 150 as shown in FIG. 8. Actuator 132 is adjusted to its operating condition for allowing lift arm 120 to float as lift arm 120 rides along guide 150 when harvester 110 is advanced further relative to header assembly 118. Harvester 110 is advanced until front face 148 of cup 134 passes beneath lift pin 136 and rear face 147 of cup 134 engages lift pin 136, there being insufficient clearance between lift pin 136 and bottom 152 of guide 150 for cup 134 to pass completely there below. With rear face 147 of cup 134 engaged against lift pin 136; cup 134 is properly positioned to receive pin 136 therein. The operator elevates lift arm 120 so that cup 134 engages lift pin 136. As lift arm 120 encounters strap 176, guide 150 is rotated about lift pin 136 until bottom 152 is held against lift arm 120.

It should be appreciated that agricultural harvester 110 includes two lift arms 120 and header assembly 118 includes two lift pins 136. During the attachment of header assembly 118 to harvester 110, even if harvester 110 and header assembly 118 are not sufficiently parallel to align each cup 134 beneath its associated lift pin 136, one lift arm 120 can push against its associated lift pin 136 to push the header assembly into proper alignment with the harvester.

Still further variations and modifications can be provided. For example, rather than using strap 176 to rotate guide 150 as described above, the guide can be rotated manually against lift arm 120 and held there against by a pin, bolt, clip or other fastener.

Figure 9:
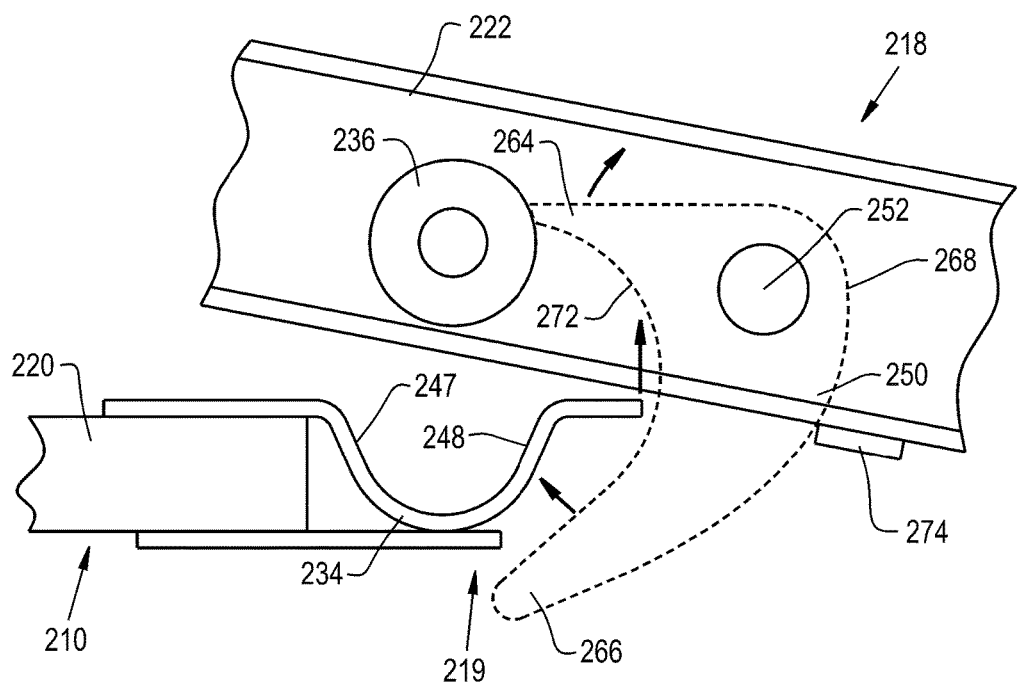
FIG. 9 is a side view of a portion of a harvester and header assembly, illustrating use of another embodiment for the guide disclosed herein.
Figure 10:
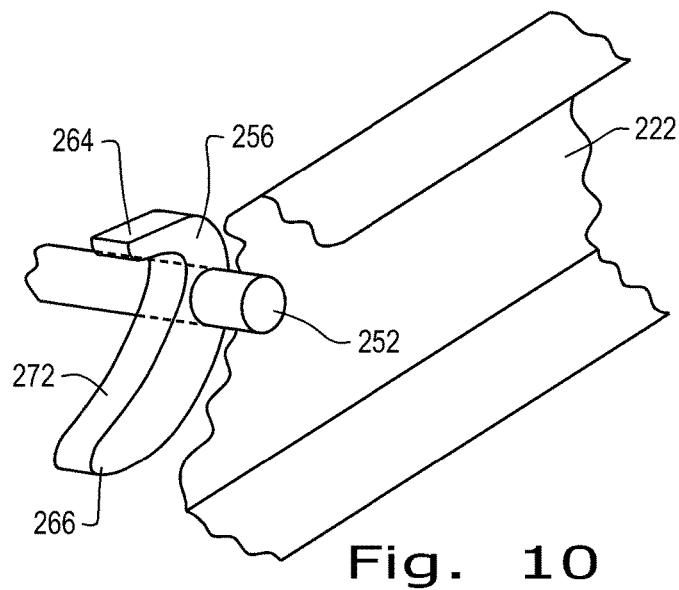
FIG. 10 is perspective view of a portion of the harvester and header assembly with the embodiment of FIG. 9.
Figure 11:
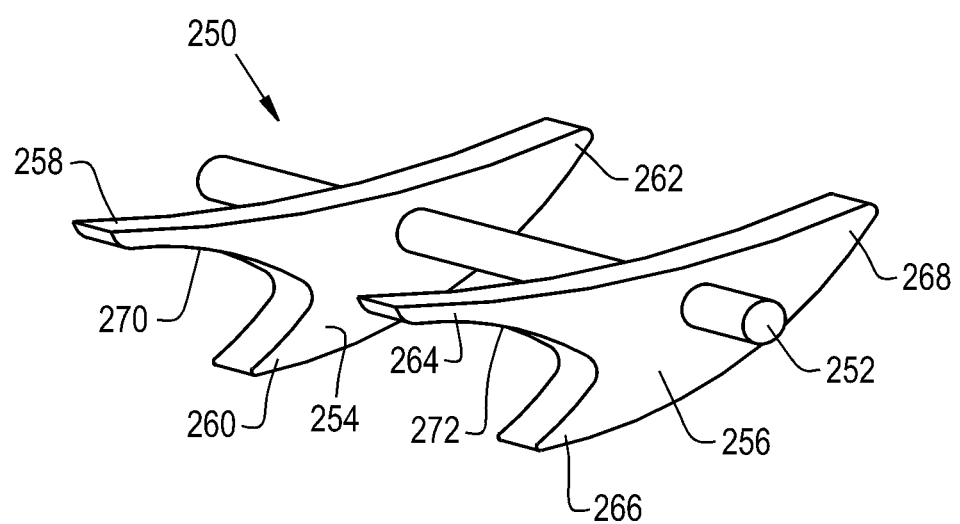
FIG. 11 is a perspective view of the guide shown in FIGS. 9 and 10.

With reference now to FIGS. 9-11, a further embodiment is shown in which an agricultural harvester 210 is connected with a header assembly 218 by way of a connection system 219. Harvester 210 includes a lift arm 220 having a cup 234 with a rear face 247 and a front face 248. Header assembly 218 includes a header frame 222 and a horizontal lift pin 236. A guide 250 is provided for directing and positioning lift arm 220 so that cup 234 engages lift pin 236. Guide 250 is connected pivotally about a pivotal attachment 252, which may be a pin, bolt or the like connected to header frame 222 and positioned inwardly of lift pin 236. Guide 250 further includes side members 254, 256 spaced from one another so that each confronts and engages cup 234 while harvester 210 is advanced toward header assembly 218 for the attachment of header assembly 218 to harvester 210. Each side member 254, 256 is generally three sided, with curved side edges. Side member 254 defines lobes 258 and 260 that are outwardly directed toward lift arm 220 and a single lobe 262 that is directed inwardly away from lift arm 220. Side member 256 defines lobes 264 and 266 that are outwardly directed toward lift arm 220 and a single lobe 268 that is directed inwardly away from lift arm 220. Accordingly, side members 254, 256 define inwardly curved arcuate outer edges 270, 272, respectively, that face outward toward cup 234 for engaging lift arm 220, with one lobe 258, 264 or point of each being above and overlie lift arm 220 and another lobe or point thereof 260, 266 being below lift arm 220 when lift arm 220 is positioned with front face 248 thereof against outer edges 270, 272. Thus, outer edges 270, 272 provide target portions 260, 266 below header frame 222, and guide lift elements in the nature of the lobes 258, 264 overlying lift arm 220. Lobes 262, 268 confront frame 222 to stop rotation of guide 250 when lift arm 220 contacts outer edges 270, 272 at the bottoms thereof. Lobes 258, 264 are configured to contact lift pin 236 and prevent over-rotation of guide 250. Alternatively, a stop 274 (FIG. 9) configured as a strip or bar can be welded or otherwise attached to frame 222 to provide the necessary interference and prevent over-rotation of guide 250, in which case only a single inwardly directed lobe may be required.

When mounting header assembly 218 on agricultural harvester 210, the harvester is advanced with lift arm 220 aligned with guide 250 which pivotally depends from pivotal attachment 252, with lobes 260, 266 as target portions visible below header frame 222. Accordingly, guide 250 provides a visible target for receiving lift arm 220. When cup 234 encounters outer edges 270, 272, advancement of harvester 210 is stopped. Lift arm 220 is raised, with the leading edge of front face 248 of cup 234 sliding along outer edges 270, 272 until cup 234 fully engages lift pin 236 therein. As lift arm 220 and cup 234 are raised while engaged against arcuate outer edges 270, 272, guide 250 is caused to rotate about pivotal attachment 252, thereby rotating guide 250 to a noninterfering orientation for the subsequent positioning and operation of header assembly 218.

While this invention has been described with respect to at least several embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A header assembly for attachment to a lift arm of an agricultural harvester, said header assembly comprising:
   a frame member;

a lift pin attached to said frame member;

a guide rotatably secured to said header assembly;

a target portion of said guide depending lower than said lift pin; and a guide lift element overlying the lift arm and operated by raising the lift arm to rotate said guide while said header assembly is being attached to the harvester and said lift arm is raised toward said lift pin.

2. The header assembly of claim 1, wherein said guide is a channel.

3. The header assembly of claim 2, wherein said channel is pivotally suspended from said lift pin.

4. The header assembly of claim 2, wherein said channel includes a flat bottom and spaced, parallel side members.

5. The header assembly of claim 4, wherein said channel is pivotally suspended from said lift pin.

6. The header assembly of claim 4, wherein said portion of said guide overlying the lift arm is a strap extending between said side members above said bottom.

7. The header assembly of claim 6, wherein said channel is pivotally suspended from said lift pin.

8. The header assembly of claim 1, wherein said guide is a channel including a bottom and spaced, parallel side members; said side members define apertures, and said sides are suspended from said lift pin extending through apertures; and a strap extends between said side members and overlies said bottom.

9. The header assembly of claim 1, wherein said guide lift element has a curved surface facing said lift arm.

10. The header assembly of claim 9, wherein said guide lift element defines a lobe overlying said lift arm.

11. The header assembly of claim 1, wherein said guide includes spaced side members pivotally held to said frame.

12. The header assembly of claim 11, wherein each of said side members has a curved surface facing said lift arm, and includes a lobe overlying said lift arm.

13. An agricultural harvester machine comprising:

an agricultural harvester;

a header assembly comprising a header frame; and a connection system between said agricultural harvester and said header assembly, said connection system comprising:

a lift arm connected to said agricultural harvester and including an upwardly opening cup at an end thereof;

a lift pin connected to said header frame and configured to be received in said cup;

a guide suspended from said header assembly and having a position to present a target portion of said guide lower than said lift, said guide adapted for pivotal rotation relative to said header assembly when said arm is raised to engage said lift pin; and a guide lift element above said lift arm for engagement by said lift arm upon said lift arm being raised toward said lift pin, for rotating said guide relative to said header assembly as said header assembly is connected to said agricultural harvester.

14. The agricultural harvester machine of claim 13, wherein said guide is a channel including a bottom and spaced, parallel side members; said side members define apertures; said sides are suspended from said lift pin extending through said apertures; and said guide lift element is a strap extending between said side members and overlying said bottom.

15. The agricultural harvester machine of claim 13, wherein said guide includes spaced side members and a pivotal connection of said side members to said header frame, and said side members have curved edges facing said lift arm.

16. The agricultural harvester machine of claim 13, wherein said guide is pivotally suspended from said lift pin.

17. The agricultural harvester machine of claim 16, wherein said guide has a rotatably selectable storage position in which said target portion is higher than said lift pin.

18. The agricultural harvester machine of claim 13, wherein said guide is pivotally suspended from said header frame.

19. The agricultural harvester machine of claim 13, wherein said guide includes spaced side members pivotally suspended from said frame.

20. The agricultural harvester machine of claim 19, wherein each of said side members has a curved surface facing said lift arm, and includes a lobe overlying said lift arm and a lobe beneath said lift arm when said lift arm is raised to engage said cup with said lift pin.

* * * * *